June 22, 1965  HANS-HEINRICH CLASSEN ETAL  3,190,312
MIXING VALVES
Filed July 3, 1963

United States Patent Office 3,190,312
Patented June 22, 1965

3,190,312
MIXING VALVES
Hans-Heinrich Classen and Josef Acker, Lobberich, Rhineland, Germany, assignors to Rokal G.m.b.H., Lobberich, Rhineland, Germany, a German company
Filed July 3, 1963, Ser. No. 292,607
Claims priority, application Germany, Feb. 26, 1963, R 34,525
5 Claims. (Cl. 137—625.4)

This invention relates to valves which are operated by a single knob or handle and are arranged to deliver hot water, cold water or a mixture of hot and cold water at choice. One kind of valve for this purpose, which may be used as a tap for baths for example, has a valve chamber with a cold water inlet, a hot water inlet, a member adjustable by rotation to allow either the simultaneous entry of hot and cold water or the entry of hot and cold water alone, and a closure member which can be moved axially, independently of the rotatable member to control or shut off the flow through an outlet from the chamber.

In accordance with the present invention, a mixing valve of the kind described has the hot water inlet in one side, the cold water inlet in the opposite side, a resilient gasket which covers the inlets but is capable of being deflected by water under pressure in the inlets to allow water to enter into the chamber, and an intermediate member which is movable to and fro in the gasket by an eccentric part of the rotatable member between positions in which it presses against one or other of the parts of the gasket covering the inlets to keep the corresponding inlet wholly or partly closed, the gasket also acting as a non-return valve to prevent return flow if the pressure in the chamber rises above that in either inlet.

One important advantage of this arrangement is that the most important but most delicate part of the valve, namely the gasket, is not continually rubbed and the intermediate member simply moves transversely into and out of engagement with the parts of the gasket which cover the inlet.

Since it is easier to make the intermediate member removable than the gasket, the intermediate member is preferably made of a substance which wears more rapidly than the other components in the mixing chamber so that the intermediate member wears preferentially and is replaced when necessary. In order to get the maximum life from the gasket, it should be mounted so that it is stationary in the mixing chamber.

The eccentric may be formed on the end of a rotatable stem and the outlet which is a single duct, may extend through the stem to the axially movable closure member which is located in the stem remote from the chamber.

The intermediate member may be a hollow slide which slides to and fro between guides and the inside surface of which is engaged by the eccentric part of the rotatable member. Alternatively, the intermediate member may be horse-shoe shaped and pivoted at the base of the horse-shoe in the mixing chamber in such a way that when it is rocked in one direction or the other about its pivot, one or the other of the arms of the horse-shoe is pressed against part of the gasket which covers a corresponding one of the inlets.

Two modifications of an example of a valve constructed in accordance with the present invention are illustrated in the accompanying drawings, in which.

Figure 1:
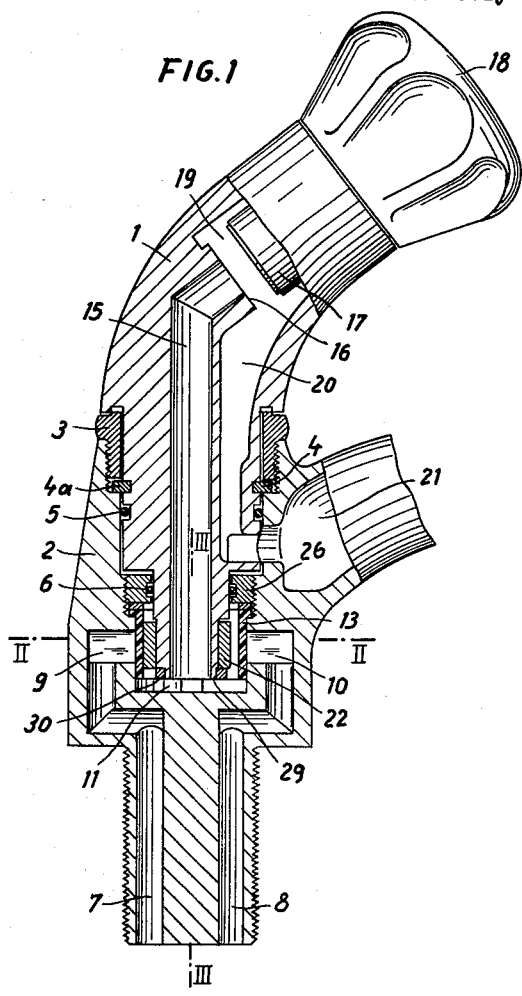
FIGURE 1 is a side view of the first modification mainly in section.

The valve has a casing 2 in one end of which a stem 1 is rotatably mounted and is held in position by a screw threaded securing ring 3 which bears against thrust segments 4 and 4a which are held in a groove in the stem 1. The annular clearance between the stem 1 and the body 2 is sealed by rubber O-rings 5 and 6 which are held in grooves in the stem. At the bottom of the casing 2 are a hot water inlet 7 and a cold water inlet 8. The hot water inlet 7 communicates with one side of a cylindrical mixing chamber 11 through a port 9 and the cold water inlet 8 communicates with the opposite side of the mixing chamber 11 through another port 10.

The base of the chamber 11 has a cylindrical recess and resilient cylindrical gasket 13 seats in this recess. The gasket is fixed in the casing 2 by means of an externally screw threaded ring 26 which is sealed to the stem 1 by the O-sealing ring 6. Within the cylindrical gasket 13 is an intermediate member which moves to and fro within the gasket when the stem 1 is rotated.

Figure 3:
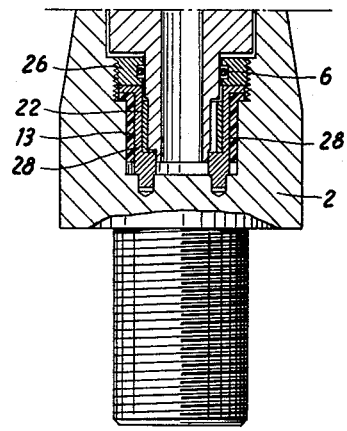
FIGURE 3 is a section taken on the line 3—3 in FIGURE 1.
Figure 2:
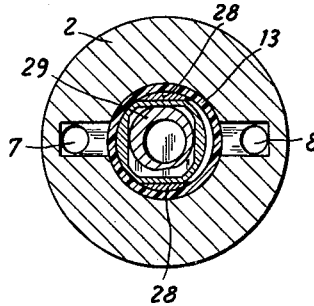
FIGURE 2 is a section taken on the line 2—2 in FIGURE 1.

In the first modification illustrated in FIGURES 1 to 3, the intermediate member consists of a hollow slide 22 which is guided between two webs 28 each of which has one end secured to the base of the cylindrical recess in the mixing chamber 11 and the other end trapped between the securing ring 26 and the top of the gasket 13. Extensions 30 of the webs 28 engage beneath the slide 22. An eccentric 29 is formed on the end of the stem 1 and extends down into and engages the inner surface of the slide 22. It is clear from FIGURE 2 that as the stem and eccentric part 22 are rotated, the slide will move from the position illustrated in FIGURE 2 in which the slides presses part of the gasket against the hot water inlet 9 and closes the inlet to a position in which it similarly closes the inlet 10 for cold water.

Figure 4:
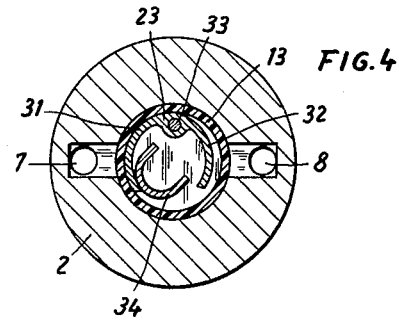
FIGURE 4 is a section corresponding to FIGURE 2 but of the second modification.

In the second modification illustrated in FIGURE 4, the intermediate member 23 is horse-shoe shaped. The outer surfaces 31 and 32 of the arms of the horse-shoe are cylindrical and conform to the curvature of the gasket 13 when the member is rocked to one limiting position or the other about its pivot 33 at its base. An extension 34 of the stem 1 is eccentric to the axis of rotation of the stem and extends down into the horse-shoe shaped intermediate member 23. When the stem 1 is rotated, the projection 34 engages one or other of the arms of the intermediate member 23 and causes it to rock towards one or other of its limiting positions in each of which one or other of the arms of the member press the gasket against a corresponding one of the inlets and closes the inlet as before.

In each modification, when the intermediate member is in a central position, the pressure of the hot or cold water supply through the ports 9 and 10 respectively deflects the resilient gasket 13 and allows the water to enter the chamber 11 between the gasket 13 and the wall of the mixing chamber. As the stem 1 is turned and the intermediate member is moved by the eccentric to one or the other of its limiting positions, the inlet towards which it moves is successively closed as the intermediate member backs up the part of the gasket which covers that inlet. The intermediate member therefore controls the proportions of hot and cold water entering the mixing chamber 11 between extreme cases in which only hot and only cold water enter the chamber.

If at any time the pressure in the mixing chamber 11 rises above the pressure in either of the inlet ports 9 or 10, the resilient gasket 13 will at once be pressed by the pressure of the water within the chamber so that it covers the inlet port which has the lower pressure and any back flow of water into this port is prevented. In this way the parts in the mixing chamber 11 of the valve operate not only to control the proportions of hot and cold water but also as a non-return valve to prevent back flow into either the hot water or the cold water inlet.

A single outlet duct 15 which extends from the mixing chamber 11 through the stem 1, terminates in a valve seat 16 for a closure member 17. The closure member 17 is carried by a spindle fixed to a knob 18 so that upon rotation of the knob 18, the closure member is screwed down into engagement with the seating or lifted from it. An outlet passageway 20 extends from a valve chamber 19 containing the closure member 17 to an outlet 21.

We claim:

1. A mixing valve for mixing hot and cold water having a single valve operating handle,
   a valve housing having a mixing chamber and hot and cold water inlet canals,
   said inlet canals having an opening leading into said mixing chamber at opposite sides,
   said operating handle having a shaft portion extending into said mixing chamber,
   a valve chamber in the outer end of said operating handle,
   a flow canal in said shaft portion communicating with said valve chamber and said mixing chamber,
   said mixing chamber having an open top communicating with said flow canal and a closed bottom having a cylindrical recess,
   flexible means secured in said mixing chamber opposite said inlet canal openings and spaced from the base of said recess,
   said shaft portion having an eccentric extension projecting into said recess,
   a movable press member disposed in said recess between said eccentric extension and said flexible means for engagement by said excentric extension to move said flexible means relative to said openings during rotation of said operating handle.

2. A mixing valve for mixing hot and cold water having a single valve operating handle,
   a valve housing having a mixing chamber and hot and cold water inlet canals,
   said inlet canals having an opening leading into said mixing chamber at opposite sides,
   said operating handle having a shaft portion extending into said mixing chamber,
   a valve chamber in the outer end of said operating handle,
   a flow canal in said shaft portion communicating with said valve chamber and said mixing chamber,
   said mixing chamber having an open top communicating with said flow canal and a closed bottom having a cylindrical recess extending axially of said shaft portion,
   a flexible sleeve secured in said mixing chamber opposite said inlet canal openings and spaced from the base of said recess,
   a hollow tubular press member of substantially square cross-section mounted for sliding movement radially in said mixing chamber and having rounded sides opposite said inlet canal openings conforming to the inner face of said chamber,
   guide means disposed in said mixing chamber on diametrically opposite sides perpendicularly of said openings and secured in the base of said recess,
   said guide means providing a transverse slide support surface for said press member,
   said guide means having a plane inner face for sliding engagement with the adjacent sides of said press member,
   said shaft portion having a hollow cam-shaped extension projecting into said mixing chamber for engaging and sliding said tubular press member relative to said openings to press said flexible sleeve against said openings at opposite locations.

3. A mixing valve for mixing hot and cold water having a single valve operating handle,
   a valve housing having a mixing chamber and hot and cold water inlet canals,
   said inlet canals having an opening leading into said mixing chamber at opposite sides,
   said operating handle having a shaft portion extending into said mixing chamber,
   a valve chamber in the outer end of said operating handle,
   a flow canal in said shaft portion communicating with said valve chamber and said mixing chamber,
   said mixing chamber having an open top communicating with said flow canal and a closed bottom having a cylindrical recess extending axially of said shaft portion,
   a flexible sleeve secured in said mixing chamber opposite said inlet canal openings and spaced from the base of said recess,
   a segmental circular press member mounted in said mixing chamber,
   means axially securing said press member for pivoting movement in said mixing chamber,
   said shaft portion having a substantially U-shaped extension projecting into said mixing chamber for engaging and pivoting said press member relative to said openings to press said flexible sleeve against said openings at opposite locations.

4. A mixing valve according to claim 3 wherein said segmental circular press member is a partial annulus pivoted at a point intermediate its ends to provide two curved side wings whose largest distance between their outer surface is smaller than the inner diameter of said sleeve.

5. A mixing valve according to claim 1 wherein said housing has an inner shoulder and said guide means has an upper flange, said flexible means being clamped between said flange and said inner shoulder.

References Cited by the Examiner

UNITED STATES PATENTS

| Re. 25,248 | 10/62 | Klaren | 251—331 XR |
| 924,052 | 6/09 | Gardenier | 251—331 XR |
| 2,519,448 | 8/50 | Fairchild | 137—607 XR |
| 2,812,154 | 11/57 | Nordstrand | 251—251 |

M. CARY NELSON, *Primary Examiner.*